United States Patent [19]
Kon

[11] Patent Number: 5,925,215
[45] Date of Patent: Jul. 20, 1999

[54] BONDING DIE FOR FORMING AN AUTOMOTIVE SEAT

[75] Inventor: Shigeki Kon, Akishima, Japan

[73] Assignee: Tachi-S Co., Ltd., Tokyo, Japan

[21] Appl. No.: 08/711,293

[22] Filed: Sep. 6, 1996

[51] Int. Cl.[6] .................................................. B29C 44/06
[52] U.S. Cl. ...................................... 156/581; 156/583.1
[58] Field of Search .................................... 156/580, 581, 156/583.1, 583.91

[56] References Cited

U.S. PATENT DOCUMENTS

| | | | |
|---|---|---|---|
| 4,873,036 | 10/1989 | Urai | 264/46.6 |
| 5,254,197 | 10/1993 | Klems | 156/272.2 |
| 5,336,352 | 8/1994 | Tokura | 156/214 |
| 5,413,661 | 5/1995 | Spengler et al. | 156/515 |
| 5,466,404 | 11/1995 | Kiefer | 264/408 |
| 5,501,829 | 3/1996 | Nichols | 264/261 |

FOREIGN PATENT DOCUMENTS

| | | |
|---|---|---|
| 5-63825 U | 9/1993 | Japan. |
| 5-72431 U | 10/1993 | Japan. |
| 6-86700 U | 12/1994 | Japan. |
| 6-86920 U | 12/1994 | Japan. |

*Primary Examiner*—Francis J. Lorin
*Attorney, Agent, or Firm*—Browdy and Neimark

[57] ABSTRACT

A bonding die for forming an automotive seat, which comprises a lower die member, an upper die member movable towards and away from the lower die member, and an elevation mechanism operable at the lower die member. A foam cushion member secured to the upper die member may be pressed and bonded to a trim cover assembly placed on the lower die member so as to produce a bonded unit for forming the automotive seat. At the completion of this bonding, the elevation mechanism is operated to lift and float the bonded unit from the lower die member to provide a state where the bonded unit may be smoothly taken out from the lower die member without tear and damage caused in the trim cover assembly.

13 Claims, 4 Drawing Sheets

BONDING DIE FOR FORMING AN AUTOMOTIVE SEAT

BACKGROUND OF INVENTION

1. Field of the Invention

The present invention relates to a bonding die for use in bonding a trim cover assembly to a foam cushion member so as to form an automotive seat, and is in particular directed to a pressure-bonding die of this kind on which the trim cover assembly is placed for a pressure bonding with the foam cushion member.

2. Description of Prior Art

As one of means for forming a seat for automobile, a bonding die is made available, by which a trim cover assembly is pressed and bonded to the outer surfaces of a foam cushion member. Reference is made to FIG. 1 which shows a typical conventional pressure-bonding die apparatus comprising a stationary lower die member (L') and a movable upper die member (U') which may be moved vertically by operation of a cylinder (D') towards and away from the lower die member (L'). A foam cushion member (P) and a trim cover assembly (C) are secured to the upper and lower die members (U')(L'), respectively. As shown by way of example in FIG. 2, the foam cushion member (P) and trim cover assembly (C) are pressed and bonded together by the die apparatus to produce a seat cushion (SC) for automotive seat, which has uneven outer shape. Thus, the cushion member (P) is formed to have a flat central seating portion (22) and a pair of lateral raised bolster portions (23)(23), whereas the trim cover assembly (C) is formed by sewing together a central cover section (10) and a pair of lateral cover sections (11, 12)(11, 12) such as to cover the central and paired bolster portions (22)(23) of cushion member (P), respectively. Naturally, in the trim cover assembly (C), a pair of spaced-apart upheld connected portions (F)(F) are created, projecting towards the reverse side of trim cover assembly (C), with a pair of valley-like groove portions (G)(G) being created at the respective portions corresponding to those two connected portions (F)(F) at the front side of trim cover assemlby (C), as can be seen in FIG. 2. In operation, the trim cover assembly (C) is reversed and placed on the lower die member (L') and then, the two connected portions (F)(F) are respectively inserted and bonded to two recessed grooves (21)(21) formed in the foam cushion member (P). The lower die member (L'), in order to permit fit and neat placing of such trim cover assembly (C) thereon, is so formed to have, defined in its outer die surface, a flat die surface (L'1), a pair of lateral curved die surfaces (L'2)(L'2) and a pair of upwardly projected retaining portions (L'3) (L'3). Hence, when placing the trim cover assemlby (C) upon the lower die member (L'), the central and lateral cover portions (10)(11) are respectively placed on the flat and curved die portions (L1')(L'2), while insuring that the two retaining portions (L'3)(L'3) are fitted in the respective two valley-like groove portions (G)(G), as in FIG. 1. Then, after applying an adhesive to either of the trim cover assembly (C) and cushion member (P), the upper die member (U') is lowered towards the lower die member (L') so that the trim cover assemlby (C) is bonded to the cushion member (P) along their mutual mating surfaces to provide a bonded unit of them. The bonded unit is removed from the base die member to finally produce a seat or a part of seat such as the seat cushion (SC) or a seat back.

However, the foregoing conventional pressure-bonding die apparatus has been found defective in that, after the bonding process, a bonded unit of trim cover assembly (C) and cushion member (P) can hardly be removed from the uneven surfaces of lower die member (L') because the outward expanding mass of foam cushion member (P) forcibly causes the bonded unit on the whole to resiliently stick to or embrace both curved die surfaces (L'2)(L'2) of lower die member (L'). Moreover, the fact that the retaining portions (L'3) of lower die member (L') are fitted in the trim cover assembly groove portions (G) renders it harder to remove the bonded unit from the lower die member (L') and also gives rise to an extreme drag or friction between those groove and retaining portions (G)(L'3) when causing the bonded unit to be removed from the lower die member (L'). Thus, removal of the bonded unit from the lower die frequently tears or damages the trim cover assembly (C).

SUMMARY OF THE INVENTION

In view of the above-stated drawbacks, it is therefore a primary purpose of the present invention to provide an improved bonding die for forming an automotive seat, which permits for smooth removal of a bonded unit of trim cover assembly and foam cushion member from a lower die member, without tear and damage caused in the trim cover assembly.

In order to attain such purpose, a bonding die in accordance with the present invention is basically comprised of:

- an upper die means to which a foam cushion member is to be secured;
- a lower die means having a die surface area upon which a trim cover assembly is to be securely placed;
- the upper die means being operable to apply a pressure to the die surface of lower die means so that the foam cushion member is pressed and bonded to the trim cover assembly, with an adhesive applied to one or both of them, so as to produce a bonded unit of trim cover assembly and foam cushion member for forming an automotive seat; and
- an elevation mechanism provided in the lower die means, which is operable to lift the foregoing bonded unit from the die surface of lower die means, the elevation mechanism including:
  - an elevation element passing through the lower die means; and
  - a drive means for causing the elevation element to project from and return to the die surface of lower die means.

Accordingly, operation of the drive means causes the elevation element to project from the die surface so as to lift the bonded unit from the lower die means before the bonded unit is taken out from the lower die means, so that the bonded unit can be removed from the lower die means without tear and damage of the trim cover assembly.

Preferably, the elevation element is normally set in a home position where the top surface thereof lies in registry of the die surface of lower die means, so that operation of the drive means permits the elevation element to project from and return to such home position.

An opening means may be defined in the lower die means to allow the elevation element to be set therein and movable therethrough by operation of the drive means.

One aspect of the present invention is that the elevation element may be disposed adjacent to at least one upwardly projected retaining portion formed in the lower die means, which is adapted for insertion into at least one groove portion created in and along at least one connected portion of the trim cover assembly, so that operating the drive means will cause the elevation element to move adjacent such at least one upwardly projected retaining portion, to thereby assist in releasing the upwardly projected retaining portion from the insertion in the groove portion of trim cover assembly.

In another aspect of the invention, in the case where the foam cushion member has at least one recessed groove in which is to be bonded the foregoing at least one connected portion of trim cover assembly, both of the opening means and elevation element stated above may be defined adjacent to the foregoing at least one upwardly projected retaining portion of lower die means, so that operating the drive means will cause the elevation element to project through the opening means and adjacent to that retaining portion of lower die means, so as to assist in releasing the upwardly projected retaining portion from the insertion in the groove portion of trim cover assembly where an intensive pressure is applied from an outward expanding mass of the foam cushion member.

Other features and advantages of the present invention will become apparent from reading of the descriptions hereinafter, with reference to the annexed drawings.

DETAILED DESCRIPTION OF PREFERRED EMBODIMENT OF THE INVENTION

Referring now to FIGS. 4 to 7, there is illustrated a pressure-bonding die apparatus in accordance with the present invention, which operates to press and bond a trim cover assembly (C) to a foam cushion member (P), wherein both trim cover assembly (C) and foam cushion member (P) are of the same type with those stated in the description of prior art above.

Figure 1:
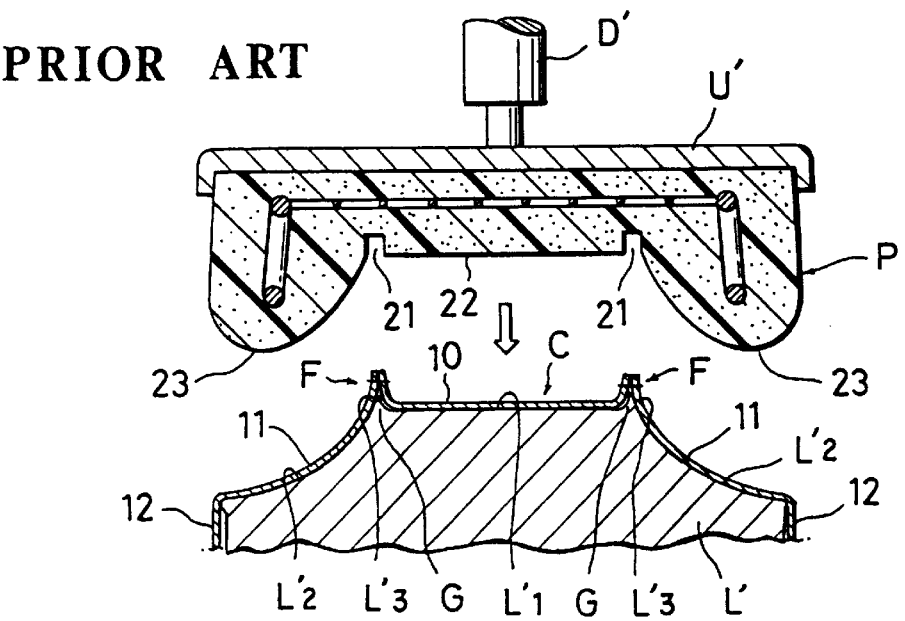
FIG. 1 is a fragmentary sectional view of a conventional bonding die apparatus.
Figure 2:
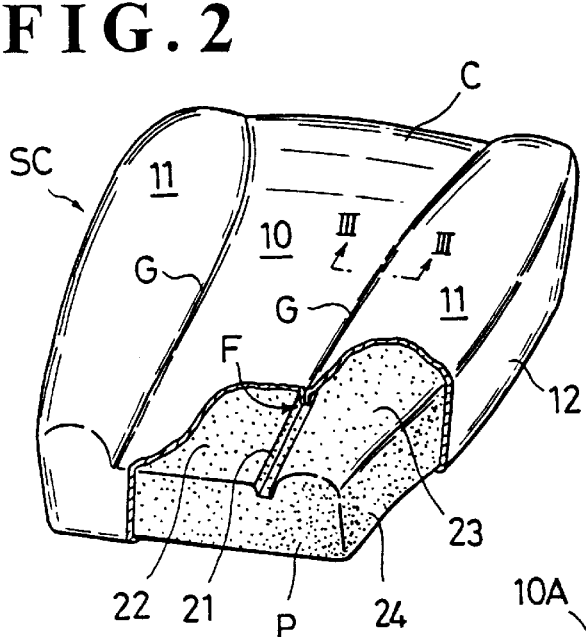
FIG. 2 is a partly broken schematic perspective view of a seat back of an automotive seat to be formed by a bonding die apparatus in accordance with the present invention.
Figure 3:
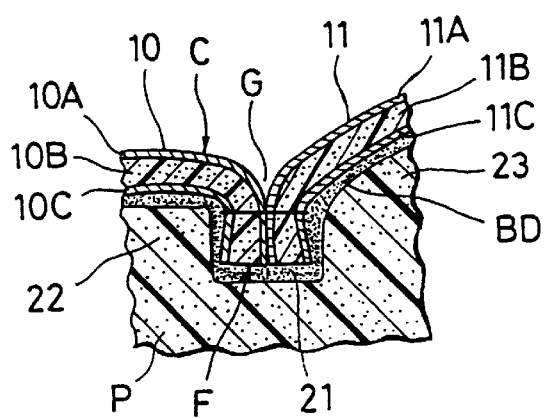
FIG. 3 is a sectional view taken along with the line III—III in FIG. 2.

With particular reference to FIGS. 2 and 3, there is depicted a typical seat structure having an uneven outer appearance which requires the foam cushion member (P) configured to define a central flat portion (22), a pair of raised lateral bolster portions (23)(23) and a peripheral side wall portion (24) therein in conformity with a predetermined outer shape of automotive seat (or a seat cushion (SC) in this embodiment), and the trim cover assembly (C) formed by sewing together a central cover section (10) and a pair of lateral and side cover sections (11, 12)(11, 12). Likewise as in FIG. 1, the cushion member (P) is formed with a pair of recessed grooves (21)(21) therein, while the trim cover assembly (C) has a pair of upheld connected portions (F)(F) created from such sewing of central and lateral cover sections (11)(11). The two connected portions (F)(F) are project towards the reverse side of trim cover assembly (C) and are to be fitted and bonded in the two recessed grooves (21)(21), respectively, in a pressure bonding process to be explained later. In this respect, along the respective two connected portions (F)(F), a pair of valley-like groove portions (G)(G) are created at the front side of trim cover assembly (C). The trim cover assembly (C) and cushion member (P) are of such three-dimensional outer configuration to form a resultant seat cushion (SC) for instance, as shown in FIG. 2. In the embodiment shown, the trim cover assembly (C) is of a three-layer lamination structure; namely, the central cover section (10A) comprises a top cover layer (10), a foam wadding layer (10B) (made of a slab urethane foam) and a back cloth layer (10C), whereas the two lateral and side cover sections (11, 12) each likewise comprises a top cover layer (11A), a foam wadding layer (11B) and a back cloth layer (11C).

Turning back to FIGS. 4 to 9, in accordance with the present invention, the pressure-bonding die apparatus comprises a movable upper die member (U) of a generally same design with that of the prior-art upper die (U') which has a cylinder (D), and a stationary lower die member (L) disposed below the upper die member (U), so that the upper die member (U) may be moved by operation of the cylinder (D) towards and away from the lower die member (L). In particular, the lower die member (L) in the present invention is basically constructed by: a die surface (L1, L2, L3, L5) configured to an outer shape of a predetermined automotive seat or seat cushion (SC); a pair of spaced-apart holes or slits (32)(32) perforated in the die surface; a pair of support leg members (37)(37); and an elevation mechanism (33, 34, 35) which is disposed under the lower die member (1) for operation to raise and lower its two elevation plate members (33)(33) through the respective slits (32)(32).

Figure 4:
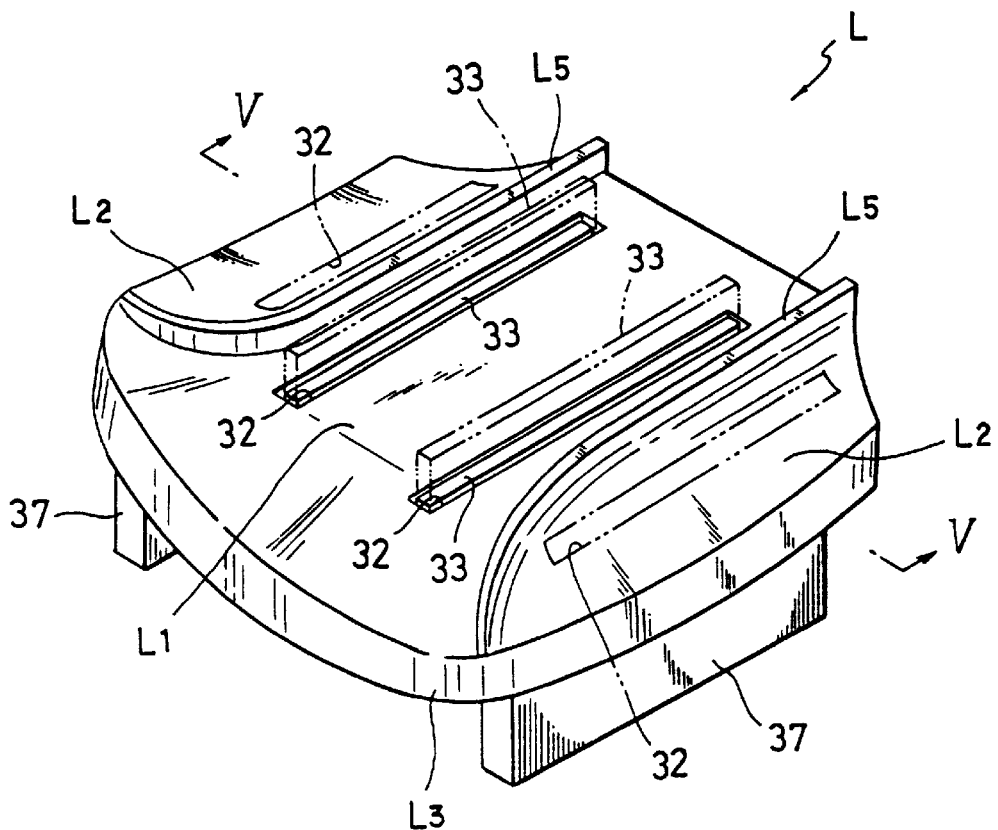
FIG. 4 is a schematic perspective view of a lower die member of the bonding die apparatus in accordance with the present invention.

Specifically, the lower die member (L) has a die surface configured to have, defined therein, a central flat die surface area (L1), a pair of downwardly curved lateral die surface areas (L2)(L2) and a pair of upwardly projected retainer flange portions (L5)(L5), each extending along the boundaries between the central and two lateral die surface areas (L1)(L2), as best seen in FIGS. 4. and 5. Those die surface areas conform to a predetermined uneven outer surface of seat or seat cushion (SC) shown in FIG. 2, and the two retainer flange portions (L5)(L5) are adapted to fit in the abovementioned two valley-like groove portions (G)(G) of trim cover assembly (C) for retaining and locating the trim cover assembly (C) at a given position for pressure bonding with the foam cushion member (P) as will be described.

The body of lower die member (L) thus formed is carried by the two support leg members (37)(37) upon a working table or floor (36).

As in FIG. 4, a pair of elongated holes or slits (32)(32) are perforated in the central die surface areas (L1) such that they extend alongside of the two retainer flange portions (L5)(L5). Strictly stated, the two slits (32)(32) are disposed inwardly of the two retainer flange portions (L5)(L5) and each extend adjacently along the respective flange portions (L5)(L5).

Figure 5:
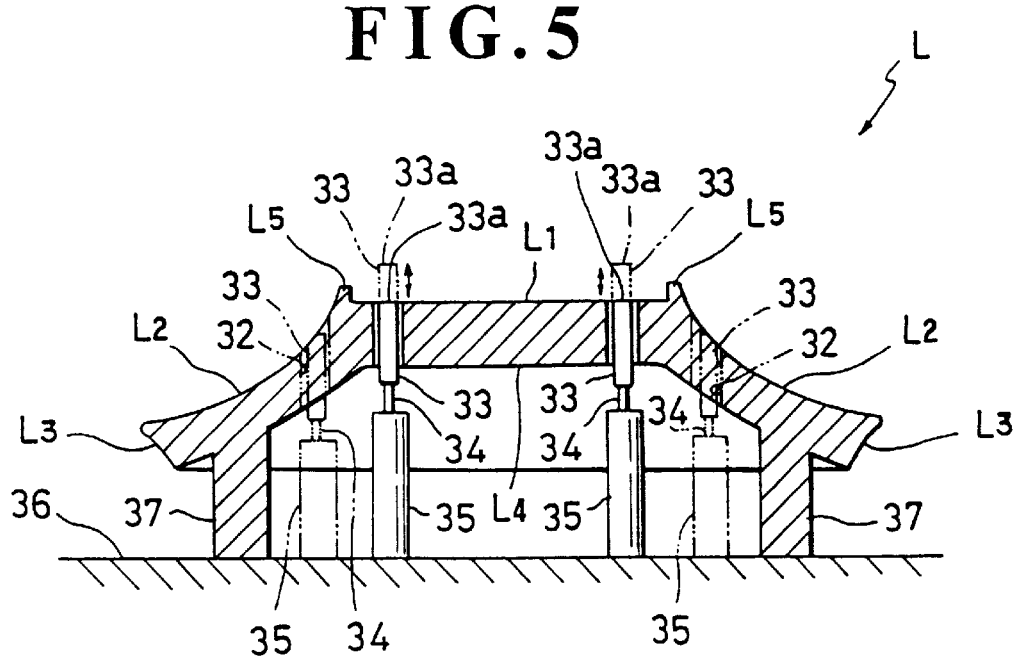
FIG. 5 is a sectional view taken along the line V—V in FIG. 4.

FIG. 5 shows an elevation mechanism, one of principal elements of the present invention, which comprises a pair of hydraulic or pneumatic cylinders (35)(35) and a pair of elevation plate members (33)(33) fixed on the respective cylinder rods (34)(34) of the cylinders (35)(35). The two cylinders (35)(35) are fixed on the working table or floor (35), upstanding therefrom towards the reverse side (L4) of lower die member (L). That is, the cylinders (35)(35) are disposed in a space under the lower die member (L) and between the two support leg members (37)(37), as shown. The two two elevation plate members (33)(33) fixed on the respective cylinder rods (34)(34) of those two cylinders (35)(35) are set in and movable through the respective two slits (32)(32) in upward and downward directions, as indicated by the arrows in FIG. 5, by operation of their associated cylinders (35)(35).

It is noted that each slit (32) is of a shape generally corresponding to the outer configuration of each elevation plate member (33), as shown, with a view to eliminating a recession or an offset point in the die surfaces of lower die member (L) which might leave its objectionable mark or print on the outer surface of resulting bonded product to be formed by the present bonding die apparatus.

Figure 7:
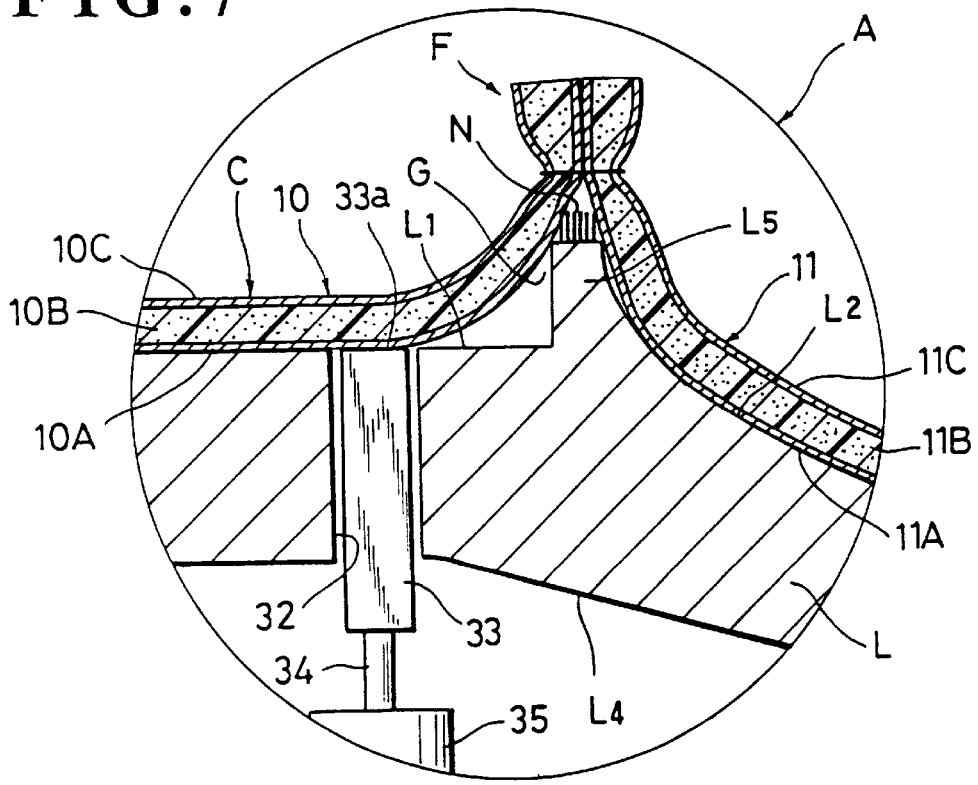
FIG. 7 is an enlarged view corresponding to the encircled part "A" in FIG. 6.

Normally, both elevation plate members (33)(33) within the slits (32)(32) are set in a home position where their respective top ends (33a)(33a) lie in registry with the flat die surface area (L1) of lower die member (L), thus establishing a coplanar relation with that flat die surface area (1), as can be seen in FIGS. 4, 5 and 7. Operating both cylinders (35)(35) causes simultaneous upward and downward motions of those two plate members (33)(33) from and towards such home position, as indicated by the solid and one-dot chain lines in FIG. 5.

Figure 8:
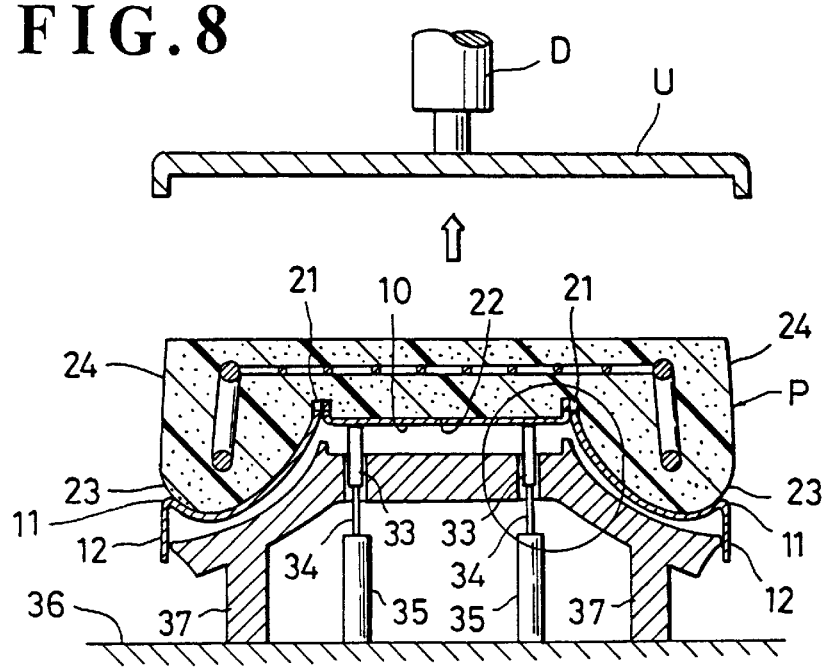
FIG. 8 is a schematic sectional view of the bonding die apparatus, which shows the state where the upper die member is raised from the lower die member.
Figure 9:
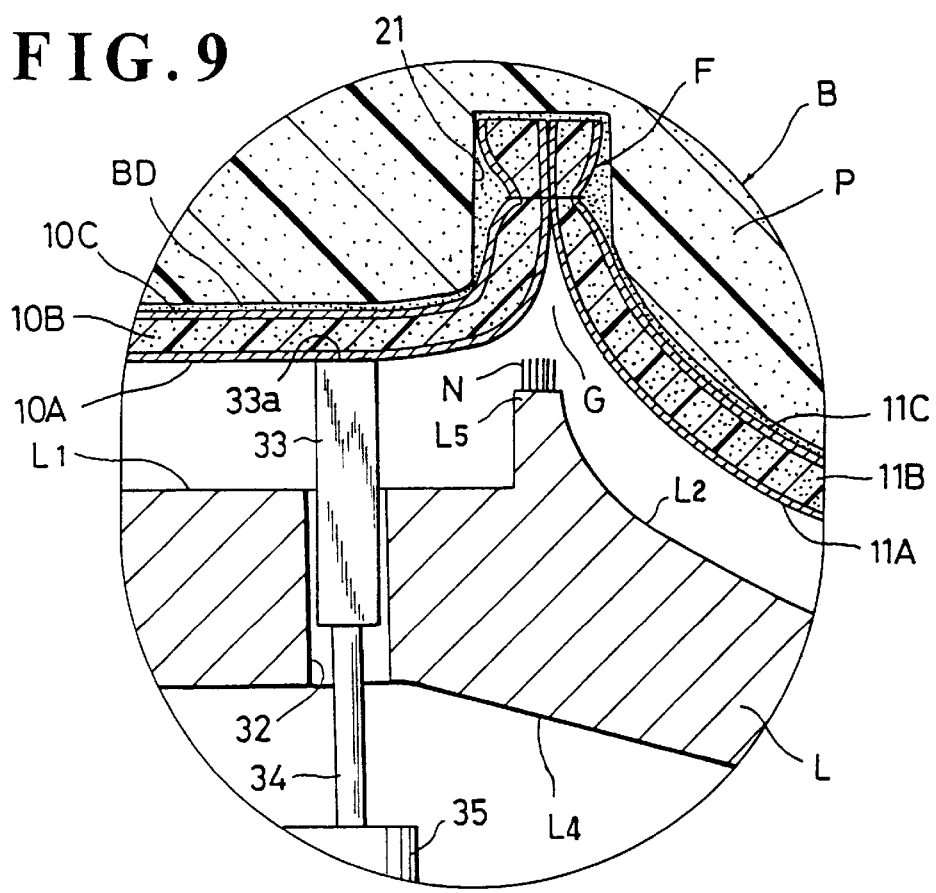
FIG. 9 is an enlarged view corresponding to the encircled part "B" in FIG. 8.

The cylinders (35)(35) are programmed or controlled to raise the plate members (33)(33) up to a level beyond the top ends of retainer flange portions (F)(F) erecting from the base die member (L), so that the trim cover assembly (C) is thereby lifted to a point where its two valley-like groove portions (G)(G) are brought completely out of contact with the two retainer flange portions (F)(F), as will be stated in detail with reference to FIGS. 8 and 9

Description will now be made of operations of the above-constructed die apparatus, with reference to FIGS. 6 to 9.

Figure 6:
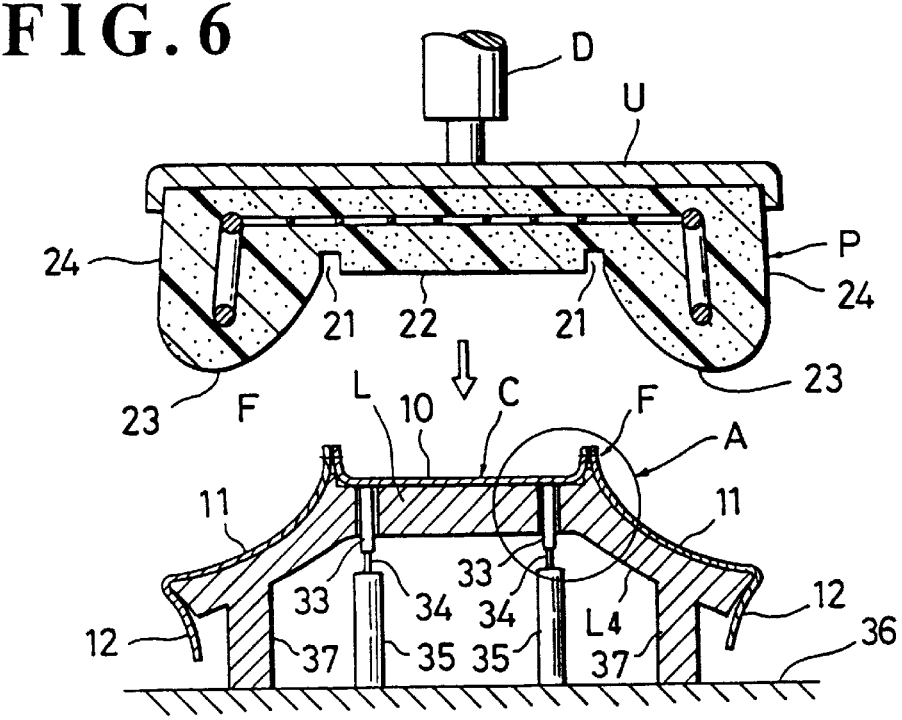
FIG. 6 is a schematic sectional view of the bonding die apparatus, which shows the state where an upper die member is lowered to the lower die member.

At first, as shown in FIG. 6, the foam cushion member (P) is secured, at its reverse flat side, to the upper die member (U), while on the other hand, the trim cover assembly (C) is turned upside down, with its reverse side (the back cloth layer (10C, 11C)) and two connected potions (F)(F) exposed upwards, and placed upon the lower die member (L). During this securing stage, a care is taken to insure that the two retainer flange portions (L5)(L5) are respectively inserted into the two valley-like groove portions (G)(G) created in the reversed front side of trim cover assembly (C). By being done as such, the trim cover assembly (C) is retained and located at a predetermined position relative to the foam cushion member dependent from the upper die member (U), and also, the central and lateral cover sections (10)(11) are set in place on their mating die surface areas (L1)(L2), while the side cover section (12) may be abutted against the peripheral die surface area (L3). At this point, both two elevation plate members (33)(33) are set in the home position where their top ends lie flush with the flat die surface area (L1), as best shown in FIG. 7.

Next, an adhesive is applied to either of the outer surfaces of cushion member (P) and the reverse side of trim cover assembly (C), or both of them. Thereafter, the cylinder (D) is operated to lower both upper die member (U) and cushion member (P) towards the trim cover assembly (C) thus secured upon the base die member (L), as indicated by the arrow in FIG. 6. Although not shown, the cushion member (P) is therefore pressed and bonded to the reverse side of trim cover assembly (C), so that the central and lateral bolster portions (22)(23) thereof are bonded to the corresponding cover sections (10)(11) of trim cover assembly (C) and also, the two upheld connected portions (F)(F) of trim cover assembly (C) are bonded in the two recessed grooves (G)(G) of cushion member (P), respectively (See FIG. 3).

After completion of this pressure bonding, as shown in FIG. 8, the upper die member (U) is released from the state secured to the cushion member (P) integral now with the trim cover assembly (C), and raised away therefrom by operation of the cylinder (D). Thus, there is produced a bonded unit of cushion member (P) and trim cover assembly (C) upon the lower die member (L). At this point, the bonded unit is given a substantive inward pressure from the outer expanding mass of foam cushion member (P) to thereby resiliently stick to or embrace the die surfaces of lower die members (L) so strongly that a friction between the trim cover assembly (C) and lower die member (L) becomes too intensive to remove the bonded unit smoothly from the lower die member (L) without damages to the trim cover assembly (C) as discussed in the description of prior art. This is particularly true of such narrow contact point between the valley-like groove portion (G) and retainer flange portion (L5). Further, the trim cover assembly (C) used, by the reason that it includes the elastic foam wadding layer (10B, 11B), adds to the foregoing inward pressure of cushion member (P), thus increasing the inward elastic closing force of the valley-like groove portion (G) towards the the retainer flange portion (L5) of lower die member (L).

In accordance with the present invention, subsequent to the foregoing bonding steps, both two cylinders (35)(35) under the base die member (L) are operated to raise their associated two elevation plate members (33)(33), as indicated by the arrow in FIG. 9, to thereby lift the bonded unit bodily from the lower die member (L) to a level at which the two groove portions (G)(G) are completely out of contact with the respective two retainer flange portions (L5)(L5). Therefore, the whole bonded unit of trim cover assembly (C) and cushion member (P) is removed and floated from the lower die member (L) before being taken out therefrom by a worker or robot hand device. This allows easy removal of the bonded unit from the lower die member (L) without any drag and friction between the trim cover assembly (C) and uneven die surfaces of lower die member (L). In particular, the elevation plate members (33) push the intensively compressed regions (at G) of the bonded unit upwards from the die surfaces (L1)(L2), thereby assisting in releasing the retainer flange portions (L5) from insertion in the inwardly pressed groove portions (G) and providing a smooth removal of the bonded unit, without tear and damage to the cover surfaces (C) thereof, from the lower die member (L). This also eliminates care about tear and damage of such multiple-layer-lamination type of trim cover assembly (C) or a thick elastic surface covering material, when it is used for bonding with the cushion member (P).

Finally, the peripheral side cover section (12) of trim cover assembly is turned up and bonded to the peripheral side wall portion (24) of cushion member (P), so as to produce such seat cushion (SC) as shown in FIG. 2.

Of course, at this final stage, both cylinders (35)(35) are operated to lower their cylinder rods (34)(34) so as to return both elevation plate members (33)(33) to the home position where their top ends (33a)(33a) lie in registry with the upper die surface area (L1) of lower die member (L), as shown in FIG. 7.

Designation (N) denotes a plurality of needles which may be fixed on the top of the retainer flange portion (L5), as is known in the art, in order to positively retain the connected portions (F) of trim cover assembly (C) against dislocation from a predetermined position for the pressure bonding with the cushion member (P). In this instance, when in operation, the elevation plate members (L5) will work advantageously to avoid contact of the needles (N) with the areas of trim cover assembly (C) adjacent to the valley-like groove portions (G), hence preventing an undesired tear in the outer surfaces of resulting bonded unit mentioned above.

It is noted that the slits (32) and elevation mechanism (33, 34 35) may be disposed at any other points in the base die member insofar as it achieves the purposes and advantages of the present invention described above. For instance, as suggested by the phantom lines in FIGS. 4 and 5, the two slits (32) may be defined at points in the die member (L) outwardly of both retainer flange portions (L5)(L5) and each elevation mechanism (33, 34, 35) be disposed right under the thus-arranged two slits (32), respectively. Also, only one set of the slit (32) and elevation mechanism (33, 34, 35) may be provided in the lower die member (L), instead of the illustrated paired set of them, insofar as it sufficiently achieves the purposes and advantages of the present invention described above. Further, both slit (32) and elevation plate member (33) may be formed in a shape extending along the whole length of illustrated curved shape of retainer flange portion (L5) of lower die member (L).

The present invention is therefore not limited specifically to all the embodiments shown in the drawings, but any other modifications, replacements and additions may be applied structurally thereto without departing from the scopes of the appended claims.

What is claimed is:

1. A bonding die for forming an automotive seat, comprising:

a lower die means having a die surface upon which a trim cover assembly is to be securely placed;

an upper die means to which a foam cushion member is to be secured, said upper die means being movable toward and away from the die surface of said lower die means so that said foam cushion member is pressed and bonded to said trim cover assembly, to produce a bonded unit of the trim cover assembly and the foam cushion member for forming the automotive seat, between said upper and lower die means; and elevation mechanism means provided in said lower die means for lifting the bonded unit from the die surface of said lower die means after said upper die means has been moved away from the die surface of said lower die means, said elevation mechanism means comprising:

an elevation element which is so provided in said lower die means as to be vertically movable therethrough, said elevation element having a top surface for contact with said trim cover assembly of said bonded unit; and a drive means for causing vertical motion of said elevation element so that said top surface of the elevation element projects toward said upper die means from a level generally coplanar with said die surface of said lower die means and returns to said level;

wherein, after said bonded unit has been produced between said upper and lower die means and said upper die means moved away from said lower die means, operation of said drive means causes said elevation element to project from said level generally coplanar with said die surface of said lower die means, and lift said bonded unit therefrom, thereby providing easy removal of said bonded unit from said lower die means.

2. The bonding die as defined in claim 1, wherein said elevation element is normally set in a home position where the top surface thereof is coplanar with said die surface area of said lower die means.

3. The bonding die as defined in claim 1, wherein said elevation element comprises at least one elevation member having an upper end portion for contact with said trim cover assembly, and wherein said drive means comprises at least one cylinder means having a cylinder rod connected to said at least one elevation member.

4. The bonding die as defined in claim 1, said die surface of said lower die means is of an uneven shape generally conforming to a predetermined uneven outer shape of said automotive seat, wherein said trim cover assembly is turned over and securely placed on said lower die means die surface, with a reverse side thereof exposed outwardly, and wherein said foam cushion member is configured to have an outer surface conforming to said predetermined uneven outer shape of automotive seat and secured to said upper die means such that said outer surface of foam cushion member faces toward the reverse side of said trim cover assembly securely placed on said lower die means.

5. The bonding die as defined in claim 1, wherein said trim cover assembly includes at least one connected portion where one cover section thereof is connected to another cover section thereof, with at least one groove portion created in and along said at least one connected portion, wherein said lower die means has at least one upwardly projected retaining portion adapted for insertion into said at least one groove portion of said trim cover assembly to thereby retain said trim cover assembly on said lower die means, and wherein said elevation element of said elevation mechanism means is disposed adjacent to said at least one upwardly projected retaining portion of said lower die means, so that operation of said drive means causes said elevation element to move adjacent to said at least one upwardly projected retaining portion.

6. The bonding die according to claim 5, wherein said top surface of said elevation element is raised to a level above and distant from a top of said at least one upwardly projected retaining portion when said drive means is operated, whereby said bonded unit of trim cover assembly and foam cushion member is removed and floated from said lower die means to a degree at which said at least one upwardly projected retaining portion is released from the insertion in said at least one groove portion of said trim cover assembly.

7. The bonding die as defined in claim 1, wherein said lower die means has, formed therein, an opening means for allowing said elevation element of said elevation mechanism to pass through said lower die means, wherein said elevation element is normally set in a home position within said opening means, at which the top surface thereof is coplanar with said die surface of said lower die means, and wherein operation of said drive means of said elevation mechanism causes said elevation element to project from and return to said home position.

8. The bonding die according to claim 7, wherein in said opening means comprises a hole which is perforated in said die surface area of said lower die means such as to have a shape generally corresponding to an outer configuration of said elevation element of said elevation mechanism.

9. The bonding die as defined in claim 1, wherein said drive means comprises a cylinder selected from one of hydraulic cylinder and pneumatic cylinder, and said elevation element comprises an elevation plate member fixed on a cylinder rod of said cylinder.

10. A bonding die for forming an automotive seat comprising:

a lower die means having a die surface upon which a trim cover assembly is to be securely placed, wherein said trim cover assembly included at least one connected portion where one cover section thereof is connected to another cover section thereof, with at least one groove portion created;

said lower die means further having a retaining means adapted for insertion into said at least one groove portion of said trim cover assembly to thereby retain said trim cover assembly on said die surface thereof;

an upper die means to which a foam cushion member is to be secured, said upper die means being movable toward and away from said die surface of said lower die, so that said foam cushion member is pressed and bonded to said trim cover assembly, to produce a bonded unit of trim cover assembly and foam cushion member for forming the automotive seat in which seat at least a first edge portion and a second edge portion are fitted and bonded in said at least one recessed groove of said foam cushion member;

an opening means defined in the die surface of said lower die means; and an elevation mechanism means provided in said lower die means for lifting said bonded unit from said die surface of said lower die means after said upper die means has been moved away from the die surface of said lower die means and said bonded unit formed between said upper and lower die means, said elevation mechanism means comprising:

an elevation element which is moveably set in said opening means of said lower die means such as to be vertically movable through said opening means, said elevation element having a top surface for contact with said trim cover assembly of said bonded unit, and a drive means for causing vertical motion of said elevation element so that a top surface of the elevation element projects toward said upper die means from a level generally coplanar with said die surface of said lower die means and returns to said level;

wherein, after said bonded unit has been produced between said upper and lower die means, operation of said drive means causes said elevation element to project from said level generally coplanar with said die surface of said lower die means, and lift said bonded unit there from thereby providing easy removal of said bonded unit from said lower die means.

11. The bonding die according to claim 10, wherein, said die surface of said lower die means is of an uneven shape generally conforming to a predetermined uneven outer shape of said automotive seat, wherein said trim cover assembly is turned over and securely placed on said lower die means die surface, with a reverse side thereof exposed outwardly, and wherein said foam cushion member is configured to have an outer surface conforming to said predetermined uneven outer shape of automotive seat and secured to said upper die means such that said outer surface of foam cushion member faces toward the reverse side of said trim cover assembly securely placed on said lower die means.

12. The bonding die according to claim 10, wherein said opening means is defined adjacent to said at least one upwardly projected retaining portion of said lower die means, so that operation of said drive means causes said elevation element to move through said opening means at a point adjacent to said at least one upwardly projected retaining portion and project to a level above and distant from a top of said at least one upwardly projected retaining portion when said drive means is operated, whereby said bonded unit of trim cover assembly and foam cushion member is removed and floated from said lower die means to a degree at which said at least one upwardly projected portion of said lower die means is released from insertion in said at least one groove portion of said trim cover assembly.

13. The bonding die according to claim 10, wherein said opening means comprises an hole which is perforated in said lower die means such as to have a shape generally corresponding to an outer configuration of said elevation element.

* * * * *